(12) United States Patent
Williams

(10) Patent No.: US 6,948,516 B1
(45) Date of Patent: Sep. 27, 2005

(54) EXCESS TIRE AIR PRESSURE RELIEF VALVE

(76) Inventor: Harold Williams, 571 Watkins St., Brooklyn, NY (US) 11212

( * ) Notice: Subject to any disclaimer, the term of this patent is extended or adjusted under 35 U.S.C. 154(b) by 328 days.

(21) Appl. No.: 10/376,708

(22) Filed: Feb. 28, 2003

(51) Int. Cl.[7] .............................................. F16K 15/20
(52) U.S. Cl. .................. 137/224; 137/543.19; 137/557
(58) Field of Search ............................... 137/223, 224, 137/225, 226, 227, 228, 230, 540, 543.17, 137/543.19, 557; 152/415, 427, 428, 429, 152/DIG. 11

(56) References Cited

U.S. PATENT DOCUMENTS

| | | | |
|---|---|---|---|
| 837,772 A | 12/1906 | Arnold | 137/230 |
| 1,179,668 A | 4/1916 | Shewmaker | 137/230 |
| 1,243,521 A * | 10/1917 | Henemeier | 137/224 |
| 1,253,098 A * | 1/1918 | Richards | 137/226 |
| 2,119,735 A * | 6/1938 | Campbell | 152/425 |
| 2,888,947 A * | 6/1959 | Montgomery et al. | 137/543.17 |
| 3,830,249 A * | 8/1974 | Fleenor et al. | 137/224 |
| 4,838,300 A * | 6/1989 | Seabase | 137/224 |
| 5,054,511 A * | 10/1991 | Tuan et al. | 137/224 |
| 5,181,977 A * | 1/1993 | Gneiding et al. | 152/429 |
| 5,275,196 A | 1/1994 | Mitchell et al. | 137/224 |
| 5,988,245 A | 11/1999 | Rosenberg | 152/427 |
| 6,408,913 B1 * | 6/2002 | Caretta et al. | 152/415 |

* cited by examiner

Primary Examiner—John Rivell
(74) Attorney, Agent, or Firm—Goldstein Law Offices, PC.

(57) ABSTRACT

An excess tire air pressure relief valve positioned on an automobile tire for relieving the pressure within the tire caused by heat or over inflation. The valve has a main tube that extends through the tire rim, to selectively communicate air from the tire interior to the tire exterior. The tube has a spring that extends between a pair of disks. A seal is positioned below the spring support disk and is pressed against a lower lip by the spring to prevent air leakage through the tube. The spring is selected to exert sufficient force against the seal to prevent air leakage through the main tube. When internal pressure is greater than normal within the tire, the spring is urged outward, allowing air to escape around the edges of the spring support disk until the internal pressure lowers such that the spring can once again hold the seal tightly against the bottom lip.

4 Claims, 2 Drawing Sheets

EXCESS TIRE AIR PRESSURE RELIEF VALVE

BACKGROUND OF THE INVENTION

The invention relates to an excess tire air pressure relief valve. In particular, the invention is a valve installed within the tire, wherein upon exceeding a pre-determined level of pressure, the valve automatically releases the air from the tire and thereby decreases the pressure to a safe level.

Automobiles have become increasingly popular, with most households owning and/or using at least one car. The owner of an automobile has the responsibility of caring for and maintaining the automobile to ensure that the vehicle does not break down. Such maintenance includes periodic oil changes, fluid transfers, and tire rotations.

Most vehicles have four tubeless radial tires. It is necessary that the tires be durable and resistant to wear and tear. Further, it is necessary that the vehicle owner routinely check the air pressure in the tires. Low pressure can cause a flat tire and too much pressure, or over inflation, can result in a "blow out" while driving. Also, it is important that the set of tires have a similar level of pressure in order to ensure a safe and smooth ride.

Most vehicle owners are unaware of the proper pressure levels for their tires and are not accustomed to examining the tires on a regular basis. Inadequate tire pressure can cause damage to the tire which may result in a dangerous condition on the road. As an automobile is driven, the tire, as well as the air contained therein is heated causing the air pressure within the tire to increase. Accordingly, the over inflation 'problem', becomes more severe once the car is driven, when the danger of a blow out can have serious consequences.

Thus, there exists a need for a device which would automatically regulate the air pressure in a tire. Such a device would be installed in the tire rim and be capable of releasing air from the tire as necessary. The device comprises a pressure sensitive relief valve that maintains the proper pounds of pressure per square inch in the tire.

U.S. Pat. No. 1,179,668 to Shewmaker discloses a safety valve for tires. The objective of the valve is to hold the pressure in a pneumatic tire below a given amount.

U.S. Pat. No. 837,772 to Arnold discloses a safety valve for pneumatic tires. The device is adapted to be screwed to the threaded portion of an ordinary inflating valve of a tire and to act in conjunction with the valve pin of the tire valve to prevent explosion of the tire from excessive pressure within the tire.

U.S. Pat. No. 5,988,245 to Rosenberg discloses a vehicle wheel assembly including protection against excessive tire pressure.

While these units may be suitable for the particular purpose employed, or for general use, they would not be as suitable for the purposes of the present invention as disclosed hereafter.

SUMMARY OF THE INVENTION

In view of the foregoing disadvantages inherent in the prior art, the present invention provides an improved excess tire air pressure relief valve. As such, the general purpose of the present invention, which will be described subsequently in greater detail, is to provide a new and improved excess tire air pressure relief valve which has all the advantages of the prior art and none of the disadvantages.

To attain this, the present invention essentially comprises an excess tire air pressure relief valve positioned on an automobile tire for relieving the pressure within the tire caused by heat or over inflation. The valve has a main tube that extends through the tire rim, to selectively communicate air from the tire interior to the tire exterior. The tube has a spring that extends between a pair of disks. A seal is positioned below the spring support disk and is pressed against a lower lip by the spring to prevent air leakage through the tube. The disks do not tightly fit against the main tube inner wall, thereby allowing air to escape around the disk edges when the seal is raised. The spring is selected to exert sufficient force against the seal to prevent air leakage through the main tube. When internal pressure is greater than normal within the tire, the spring is urged outward, allowing air to escape around the edges of the spring support disk until the internal pressure lowers such that the spring can once again hold the seal tightly against the bottom lip.

It is an object of the invention to produce an excess tire air pressure relief valve that prevents a tire from remaining overinflated. Accordingly, the valve automatically dispels air that exceeds the recommended pounds of pressure per square inch (psi) for the tire.

It is a further object of the invention to warn the driver that the tire was overinflated. Accordingly, the tube has a whistle which produces an audible whistling sound when air is escaping through the relief valve.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

Figure 1:
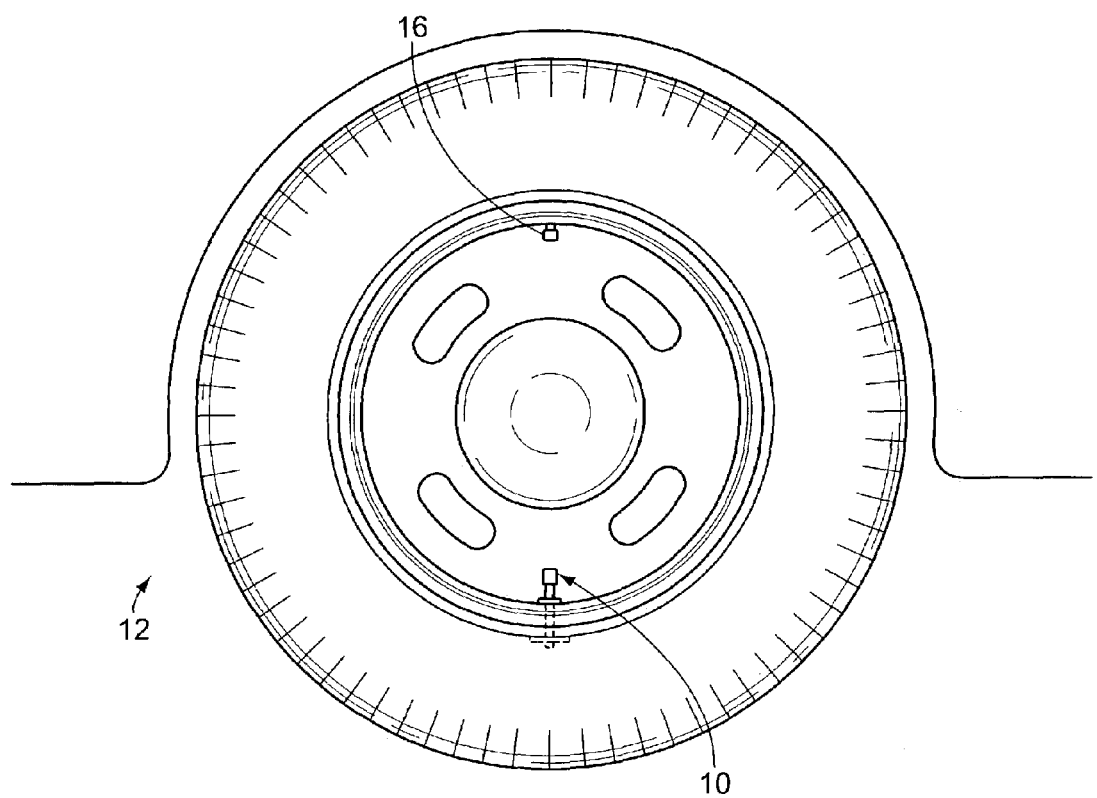
FIG. 1 is a front elevational view of an automobile tire having an inflation valve and an excess tire air pressure relief valve installed therein.

REFERENCE NUMERALS 10 excess tire air pressure relief valve
12 tire
14 tire outer rim
14A rim outer surface
14B rim inner surface
16 inflation valve
18 main tube
18W tube inner wall
18D tube outer wall
18T tube top portion
18B tube bottom portion
18M tube middle portion
20 spring
22 top spring restraint disk
24 bottom spring support disk
26 shoulder 28 central opening
30 bottom edge
32 lip
34 seal
36 whistle
38 cap
40 cap hole
42 C-ring
44 neck indentation
46 lock nut

DETAILED DESCRIPTION OF THE PREFERRED EMBODIMENTS

FIG. 1 illustrates an excess tire air pressure relief valve 10 positioned on an automobile tire 12. A standard tire 12 has an outer rim 14 that extends around the tire 12, wherein an interior volume is contained within the confines of the rim 14. The rim 14 has an outer surface 14A and an inner surface 14B. The tire 12 further comprises an inflation valve 16 through which air is pumped into the interior volume of the tire 12. The excess tire air pressure relief valve 10 extends from exterior to the tire 12, through the tire outer rim 14, and into the tire interior volume. The relief valve 10 dispenses excess air from within the tire 12 to reduce the pressure within said tire 12.

The relief valve 10 comprises a main tube 18 that extends through the tire rim 14, from the rim outer surface 14A to the rim inner surface 14B, and an air release assembly housed within the main tube. The main tube 18 has an outer wall 18D, an inner wall 18W, a top portion 18T that extends above the rim outer surface 14A, a bottom portion 18B that is positioned near the rim inner surface 14B, and a hollow middle portion 18M that extends between the top and bottom portions 18T, 18B. The air release assembly comprises a spring 20 within the main tube bottom portion 18B, the spring 20 extends between a top spring restraint disk 22 and a bottom spring support disk 24. The spring restraint disk 22 has a central opening 28 defined by a shoulder 26 which is large enough to engage the spring 20, while still allowing air to escape through the central opening 28.

The main tube 18 further comprises a bottom edge 30 having a lip 32 extending inwardly therearound, said lip 32 leaving an opening through which air may travel from the interior of the tire 12 into the main tube 18. A seal 34 is positioned between the lip 32 and the spring support disk 24. The spring support disk 24 does not tightly fit against the inner walls 18W of the main tube 18, thereby allowing air to escape around the disk edges when the seal 34 is raised. The spring 20 is selected to exert sufficient force against the seal 34 to press against the lip 32 and prevent air leakage through the main tube 18 when internal pressure within the tire interior indicates that the tire 12 is normally inflated. When internal pressure is greater than normal due to increased heat or over inflation, the spring 20 is urged outward raising the seal slightly above the lip 32 and thereby allowing air to escape around the edges of the spring support disk 24 until the internal pressure lowers such that the spring 20 can hold the seal 34 tightly against the bottom lip 32.

A whistle 36 is positioned within the main tube top portion 18T. Further, a cap 38 extends over the tube top portion 18T, said cap 38 having a hole 40 therethrough. Upon release of air through the main tube 18, said air escapes from the tire 12 through the hole 40 in the cap 38. As the air passes through the top portion whistle 36, a hissing sound is produced in order to alert a person of the escape of air.

Figure 2:
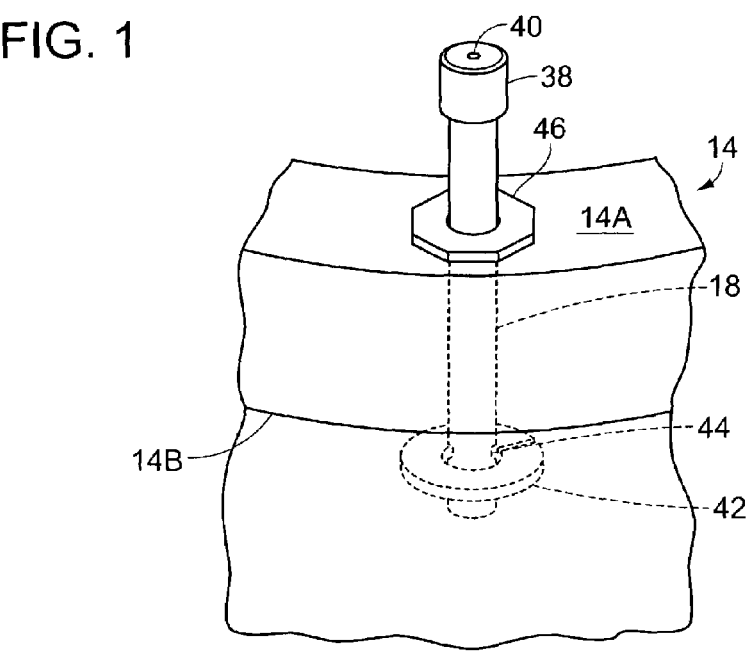
FIG. 2 is an enlarged view of the excess tire air pressure relief valve.
Figure 3:
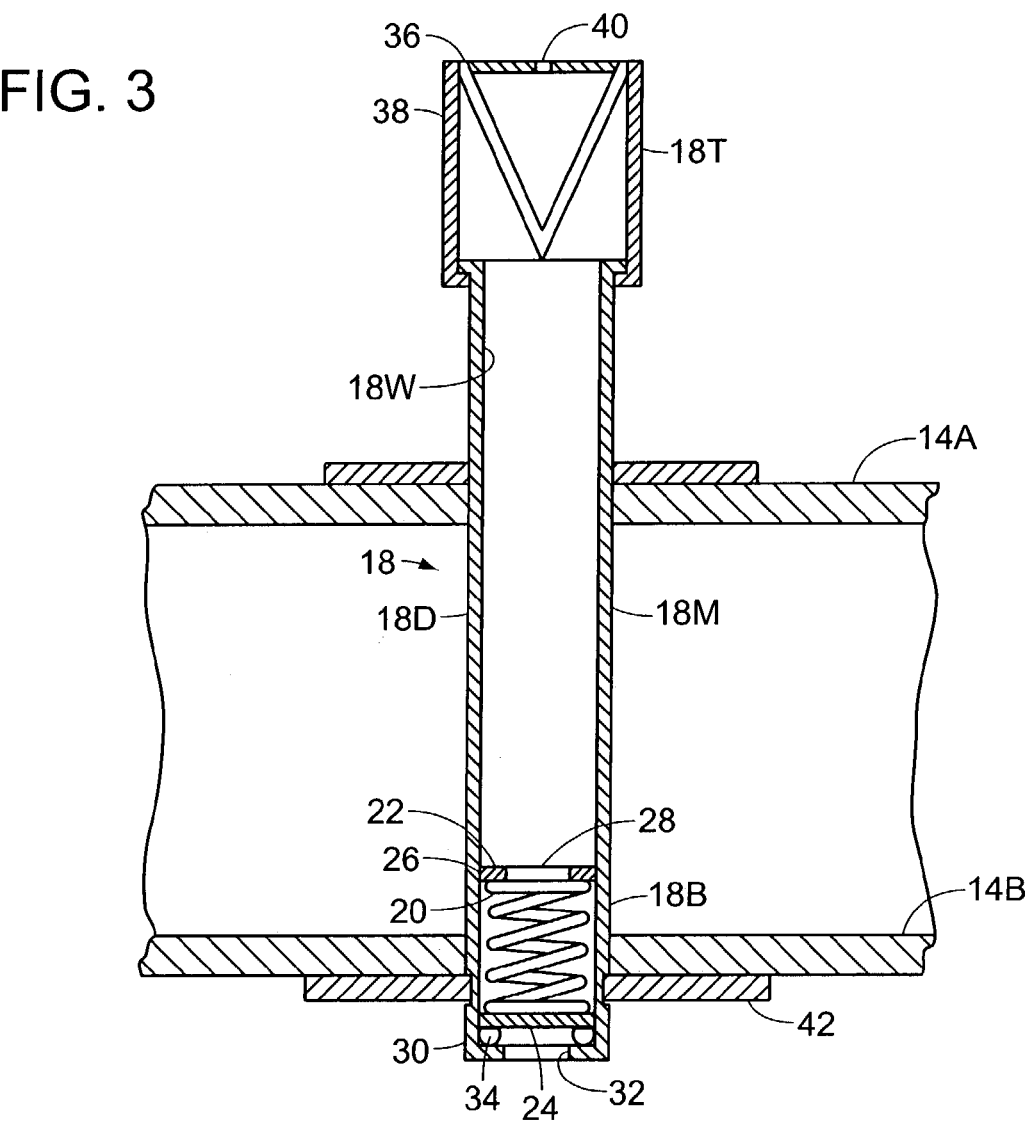
FIG. 3 is a cross sectional view of the excess tire air pressure relief valve.
Figure 4:
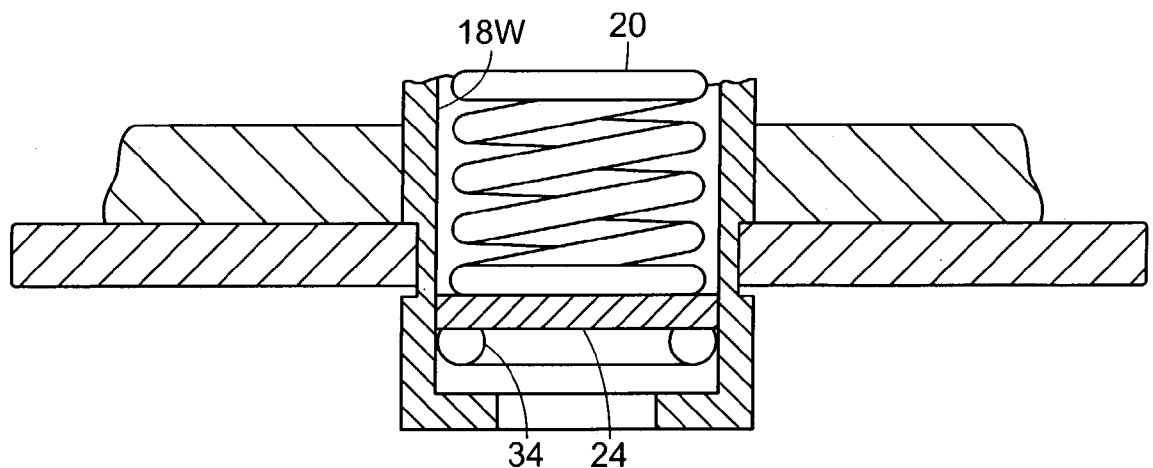
FIG. 4 is an enlarged view of the valve seal taken about circle 4 in FIG. 3.

The main tube 18 has a neck indentation 44 extending around the tube outer wall 18D. The indentation 44 is positioned below the rim inner surface 14B. Referring to FIG. 2, a C-ring 42 extends around the tube indentation 44. This ring 42 prevents the relief valve 10 from being mistakenly or inadvertently outwardly removed from the tire 12. Further, a lock nut 46 is positioned around the tube outer wall 18D at the top portion 18T. The nut 46 is mated with the tube top portion 18T and rests upon the rim outer surface 14A in order to hold the valve 10 in place.

In conclusion, herein is presented an excess tire air pressure relief valve. The invention is illustrated by example in the drawing figures, and throughout the written description. It should be understood that numerous variations are possible, while adhering to the inventive concept. Such variations are contemplated as being a part of the present invention.

What is claimed is:

1. An excess tire air pressure relief valve for use on an automobile tire, the tire having an interior volume filled with air, and a rim comprising a rim outer surface, a rim inner surface, and an inflation valve in communication with the interior through the rim, comprising:

a main tube, the main tube extendable through the tire rim to the tire interior, said main tube having an outer wall, an inner wall, a top portion extendable above the rim outer surface, a cap extending over the tube top portion, said cap having a hole therethrough for allowing air to be released from within the main tube, a whistle located within the top portion, a bottom portion extendable below the rim inner surface, and a hollow middle portion extending between the top portion and bottom portion, the main tube further having a bottom edge, the bottom edge having a lip extending inwardly therearound, the main tube also having a neck indentation at the bottom portion, the indentation extends around the tube outer wall below the rim inner surface;

an air release assembly, the assembly positioned within the bottom portion of the main tube, said assembly comprising a spring extending between a top spring restraint disk and a bottom spring support disk, the spring restraint disk having a shoulder that engages the spring and which defines a central opening, the assembly further comprising a seal attached directly between the bottom spring support disk and the lip, whereby pressure from the air within the tire interior forces the bottom spring support disk to push upward against the spring, thereby allowing air to escape from within the tire interior through the main tube and out of the tire; and a C-ring, and wherein the and the C-ring extends around the tube indentation, said ring preventing the air release valve from being removed from the tire.

2. The excess tire air pressure relief valve as recited in claim 1, wherein the spring support disk does not tightly fit against the inner walls of the main tube in order to allow air to pass around the disk edges when the seal is raised upward against the spring because of pressure from within the tire.

3. The excess tire air pressure relief valve as recited in claim 2, wherein the spring is selected to exert force against the seal to prevent air leakage through the main tube when the pressure within the tire is normal.

4. The excess tire air pressure relief valve as recited in claim 3, wherein the main tube further comprises a lock nut positioned around the tube outer wall at the top portion, said nut being mateable with the tube top portion and resting upon the rim outer surface in order to hold the valve in place.

* * * * *